United States Patent [19]
McEathron

[11] 3,966,269
[45] June 29, 1976

[54] FLUID BRAKE CONTROL SYSTEM

[75] Inventor: Eugene Douglas McEathron, Watertown, N.Y.

[73] Assignee: General Signal Corporation, Rochester, N.Y.

[22] Filed: Sept. 12, 1975

[21] Appl. No.: 612,840

[52] U.S. Cl. .................................. 303/37; 303/66; 303/69
[51] Int. Cl.² .................... B60T 15/30; B60T 15/52
[58] Field of Search .............................. 303/36–38, 303/66, 69, 81

[56] References Cited
UNITED STATES PATENTS

| | | | |
|---|---|---|---|
| 1,326,211 | 12/1919 | Neal | 303/37 |
| 1,845,492 | 2/1932 | Farmer | 303/66 |
| 1,879,643 | 9/1932 | Thomas | 303/69 |
| 2,215,347 | 9/1940 | Cook et al. | 303/66 |

Primary Examiner—Duane A. Reger
Attorney, Agent, or Firm—Harold S. Wynn

[57] ABSTRACT

A fluid brake control system is disclosed having an improved quick service and accelerated release control device having valves operable when rendered effective to locally reduce the brake pipe pressure to accelerate a brake application signal through a train and at other times to apply fluid to the brake pipe for accelerating the release of brakes of a train. The control device comprises a housing containing a fluid pressure differential operated abutment subject to actuation from a normal position by differences in pressure between respective brake pipe and reference fluid pressure chambers on opposite sides of the abutment. Two quick service valves of the ball poppet type are provided on one side of the abutment that are spring biased in the direction of the abutment against their valve seats to normally closed positions and have operating push rods longitudinally disposed between the associated ball poppet valves and one side of the abutment. A ball poppet valve on the other side of the abutment is also normally closed and is opened by movement of the abutment in the other direction for delivering fluid from an emergency reservoir to the brake pipe for providing accelerated release.

26 Claims, 1 Drawing Figure

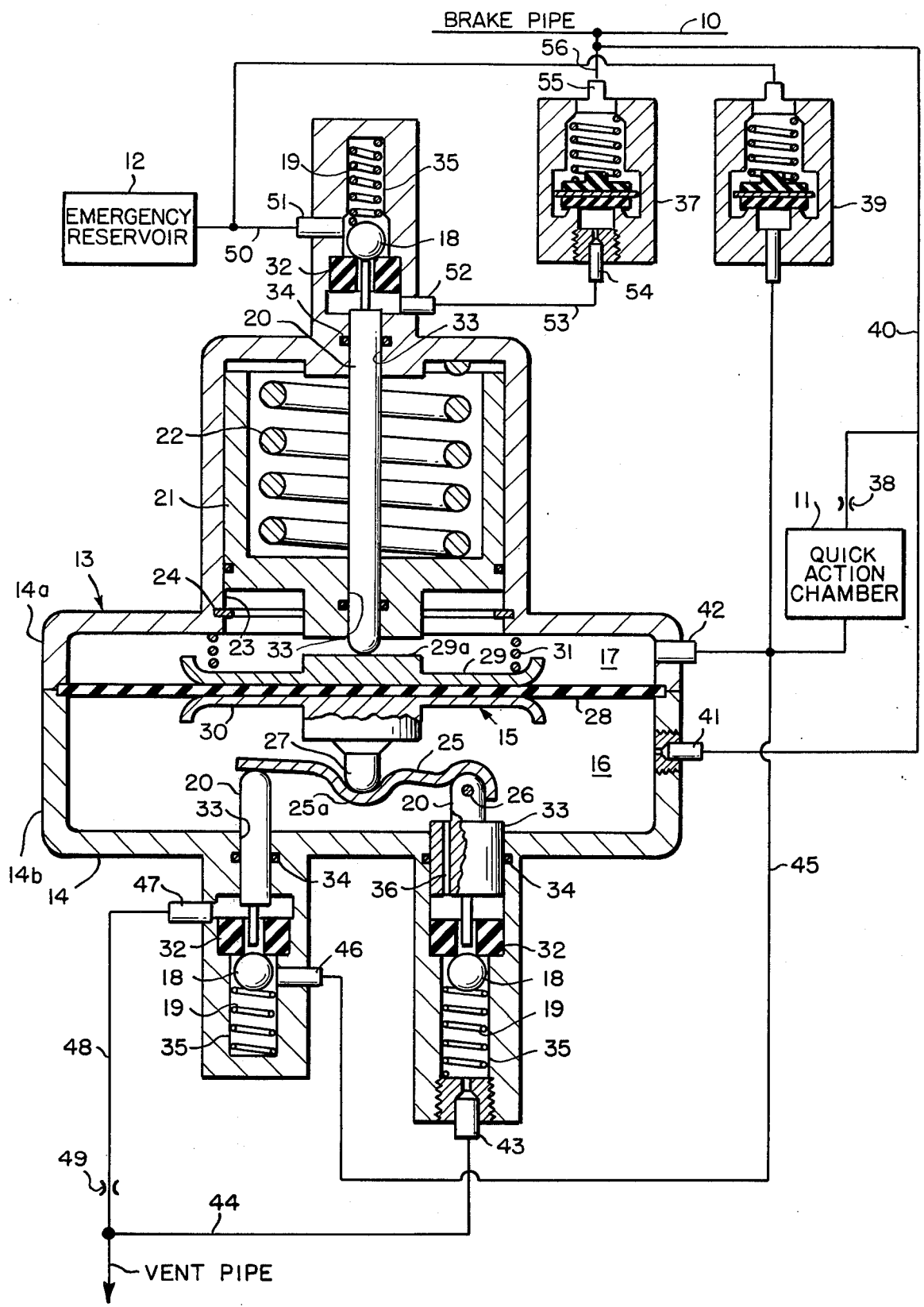

FLUID BRAKE CONTROL SYSTEM

BACKGROUND OF INVENTION

This invention relates to fluid brake control systems, and while the invention is subject to a wide range of applications, a preferred embodiment of the invention will be particularly described as applied to a fluid brake control system having an improved quick service and accelerated release control device.

The present invention is an improvement over currently used quick service and accelerated release control devices such as the quick service and accelerated release control devices of the well-known ABD control valve generally used for governing the brakes of freight cars. In the ABD valve, a form of quick service function is provided by the service slide valve but to provide repeated quick service cycles as long as the brake pipe pressure continues to be reduced from an extraneous source, the ABD valve must be supplemented by a special quick service control device such as the well-known B1 quick service valve.

The accelerated release function as provided in the ABD valve requires separate control devices for service and emergency release functions respectively. The ABD device for accelerated service release senses relative brake pipe and auxiliary reservoir pressures, while the accelerated release for an emergency brake application is provided by the actuation of a spool valve associated with an emergency release slide valve.

These valves as provided in the ABD valve are costly to manufacture and are somewhat slow to respond because of sliding friction. Smooth and quick application and release of brakes of a train is dependent upon the speed at which a change in control is sensed by each car and passed along from car to car, beginning at the front end of the train. It is therefore very important that there be as little delay as possible in the successive operation of the quick service and accelerated release valves on the respective cars of a train. It is therefore highly desirable to increase the speed and integrity of propagation of a brake control signal through a train over the rate of operation currently possible with ABD slide and spool valves.

An object of the present invention is to provide a fluid brake control system having improved quick service and accelerated release valves which substantially obviate one or more of the limitations and disadvantages of the described prior system.

Another object of the present invention is to reduce the number of control devices required to provide the functions of quick service and accelerated release controls.

Another object of the present invention is to reduce manufacturing and maintenance cost of brake application and release control devices.

Other objects, purposes and characteristic features of the present invention will be in part obvious from the accompanying drawings, and in part pointed out as the description of the invention progresses.

SUMMARY OF INVENTION

A fluid brake control system is provided for a train of cars including a car having a brake control pipe, a quick action chamber subject to charge periodically from the brake pipe and an improved quick service control device comprising a housing containing a fluid pressure differential operated abutment subject to actuation from a normal position by differences in pressure between respective brake pipe and reference fluid pressure chambers acting on opposite sides of the abutment. Two poppet type valves are provided on the brake pipe pressure chamber side of the abutment for selectively venting the pressure chambers, each of the valves being spring biased in a direction of the abutment to a normally closed position and the valves having respective operating push rods longitudinally disposed between the assocated valves and the abutment. The poppet valves are opened by movement of the abutment in one direction from its normal position and fluid circuits are provided, including the poppet valves, for permitting flow from the brake pipe pressure chamber and from the reference pressure chamber respectively for cyclically locally reducing pressure in the brake pipe repeatedly as long as the brake pipe continues to be reduced in pressure independent of the action of the poppet valves.

The above described control device also provides accelerated release control by providing a poppet type valve on the reference chamber side of the abutment that is spring biased in the direction of the abutment to a normally closed position, this valve having an operating push rod longitudinally disposed between the poppet type valve and the abutment for opening the valve in accordance with movement of the abutment in the direction of the reference pressure chamber to permit fluid to flow from the emergency reservoir to the brake pipe. Additional spring biasing means including a piston having an axial bore for free passage of the valve operating push rod is provided for applying additional spring bias against movement of the abutment in the direction of the reference pressure chamber to open the accelerated release valve only when fluid pressure is materially reduced in the reference chamber, such as after an emergency brake application. Thus this spring is effective for accelerated release control after an emergency brake application but not after a service brake application.

Although the functions of quick service and accelerated release are combined in a single control device as compared to prior use of several devices for each of these functions, it is to be understood that the accelerated release control function and the quick service control function can be used separately, independent of the other function if such is the requirements of practice.

The poppet valves used are preferably of the ball type, spring biased to a closed position against a seat for requiring a minimum travel of the abutment to actuate the valves with a minimum amount of friction involved. It has been found that satisfactory operation is obtained in an operating range of the abutment from its normal position of approximately fifty thousandths of an inch.

For a better understanding of the present invention, together with other and further objects thereof, reference is had to the following description taken in connection with the accompanying drawing, while its scope will be pointed out in the appending claims.

The drawing is a sectional axial view of a quick service and accelerated release control device together with a schematic diagram of a fluid brake control system in which it can be used as a preferred emodiment of the present invention.

With reference to FIG. 1, a fluid brake control system is illustrated for a typical car in a train including a brake control pipe 10, a reference fluid reservoir in the form of quick action chamber 11 that is subject to charge from the brake pipe 10 and an improved quick service control device 13. The device 13 has a housing 14 containing a fluid pressure differential operated abutment 15 subject to actuation from a normal position in which it is illustrated by differences in pressure between respective brake pipe and reference fluid pressure chambers 16 and 17 respectively acting on opposite sides of the abutment 15 within the housing 14.

Two poppet type valves 18 on the brake pipe pressure chamber side of the abutment 15 are provided for selectively venting the chambers 16 and 17, each of these valves 18 being biased by a spring 19 in the direction of the abutment 15 to a normally closed position and the valves 18 having respective operating push rods 20 longitudinally disposed between the associated valve 18 and the abutment 15. The poppet valves 18 are opened by movement of the abutment 15 downwardly and fluid circuits are controlled by the valves 18 for permitting fluid flow from the brake pipe pressure chamber and from the reference pressure chamber respectively for cyclically locally reducing pressure in the brake pipe 10 as long as the brake pipe 10 continues to be reduced in pressure extraneous of the valves 18 as by brake pipe pressure reduction in an adjoining car or in the locomotive.

Improved accelerated release control is provided by another poppet type valve 18 on the upper side of the abutment 15 that is biased by a spring 19 in the direction of the abutment 15 to a normally closed position. This valve has an operating push rod 20 longitudinally disposed between the associated poppet type valve 18 and the abutment 15 for opening the accelerated release valve 18 in accordance with the movement upwardly of the abutment 15 from its normal position. When this valve is opened, fluid is supplied from emergency reservoir 12 through the accelerated release valve 18 to the brake pipe 10.

Additional spring biasing means is used for accelerated release after an emergency brake application, including a piston 21 having an axial bore 33 for free passage of the push rod 20 associated with the accelerated release valve 18. The piston 21 is biased downwardly by a spring 22, and is biased upwardly by fluid pressure in the reference chamber 17. It is this upward bias by fluid pressure in chamber 17 that makes the spring 22 selectively effective against the abutment during accelerated release after an emergency brake application but not after a service brake application. The piston 21 is operable in a bore 23 to an extent limited by a stop 24 which is illustrated as a snap ring in the bore 23. This ring limits downward movement of the piston 21 so that it will have no influence on movement of the abutment 15 downwardly from its normal position in which it is illustrated.

The laterally spaced push rods 20 associated with the valves 18 beneath the abutment 15 are connected at their upper ends by a bridge 25 that is pivotally connected to the right-hand push rod 20 by a pin 26. At a mid-point in the bridge 25, the bridge 25 is recessed downwardly at 25a to receive a detent 27 in abutment 15.

The abutment 15 comprises an annular diaphragm 28 secured between upper and lower housing portions 14a and 14b respectively, and annular diaphragm follower plates 29 and 30 are secured axially on upper and lower sides respectively of the diaphragm 28. The plate 29 has a bearing surface 29a for the lower end of push rod 22 above the abutment 15. Similarly the lower plate 30 has a detent 27 integral therewith for engagement with bridge 25 as has been described to operate the push rods 20 below the abutment 15 for actuation of the valves 18 below the abutment 15, and permit sequential operation of these valves 18, dependent upon relative forces of their springs 19.

A light stabilizing spring 31 is preferably disposed axially between plate 29 and the upper housing portion 14a as provided by the two springs 19 of the valves 18 on the lower side of the abutment 15. Thus the valves can be adjusted, if desired, so that substantially the same difference in pressure in one direction is required to open the valves above the abutment 15 that is required in the opposite direction to open the valves below the abutment 15.

The valves 18 are similar in that they are ball poppet valves urged by springs 19 against ends of tubular resilient seats 32. The push rods 20 for operating their associated valves 19 are operable with minimum friction within bores 33, and O-rings 34 are used to prevent leakage from the pressure chambers 16 and 17. The push rods 20 are of reduced diameter at their ends adjoining the valves 18 to permit free passage of fluid through the associated valves 18 when these valves are opened. The valve biasing springs 19 are contained in suitable bores 35 in the housing 14. The lower right-hand push rod 20 is larger in diameter than the other push rods 20 to include an internal passage 36 as an inlet port for the lower right-hand valve 18. Also the push rod 20 for valve 18 on the upper side of the abutment 15 is longer than the other push rods to extend through a bore 33 in piston 21 as has been described.

An accelerated release check valve 37 is provided for connecting the accelerated release valve 18 to the brake pipe 10. The quick action chamber 11 is charged from the brake pipe 10 through a choke 38, and quick action chamber 11 is connected to emergency reservoir 12 through a spill-over check valve 39.

In practice, the quick service and accelerated release control device 13 that has been described can be used in place of several valves providing corresponding functions in the ABD valve, thus simplifying and improving the ABD valve control apparatus. It should be considered that the simplified disclosure of a railway car braking system in the present embodiment is done to simplify the disclosure of the present invention rather than to limit the environment in which the invention can be applied. For example, additional controls can be provided as in the ABD valve for charging the emergency reservoir 12 and the quick action chamber 11 and in connection with venting the pressure chamber to atmosphere in accordance with the requirements of practice.

Upon initially charging the brake pipe 10, fluid enters chamber 16 via passage 40 and choke 41. The quick action chamber 11 also charges at this time through choke 38, and the emergency reservoir 12 can be charged from the brake pipe through a suitable choke (not shown) as is done in the ABD valve. The reference chamber 17 is charged through port 42 from the quick action chamber 11. Thus, under normal conditions, chambers 16 and 17 are charged to substantially the same pressures, and the abutment 15 assumes its normal position as is illustrated permitting the closure of all valves 18 by their associated biasing springs 19.

To illustrate the quick service operation of the control device 13, it will be assumed that the brake pipe 10 has been fully charged, and that a service brake application is initiated by causing a continuous reduction in the pressure in brake pipe 10 at a service rate. This reduces the pressure in chamber 16 of control device 13 relative to the reference pressure in chamber 17, causing the abutment 15 to be actuated downwardly to successively open the valves 18 below the abutment 15, the right-hand valve 18 being opened first because of having a weaker spring 19 than the left-hand valve so as to initially vent fluid from the brake pipe through passage 40, choke 41, chamber 16, passage 36, valve 18 and vent passage 44 to atmosphere. Thus a cycle of local quick service reduction of brake pipe pressure is initiated, and as the right-hand valve 18 draws the pressure down further in chamber 16 relative to chamber 17, the abutment 15 becomes deflected downwardly further so as to open the left-hand valve 18 for venting the quick action chamber 11 to atmosphere. The sequential opening of these valves is permitted by the rocking of the bridge 25 about its pivot point 25a on the detent 27 of abutment 15. Opening of the lower left-hand valve 18 causes quick action chamber air to be vented to vent passage 44 from the quick action chamber 11 through passage 45, inlet port 46, lower left-hand valve 18, outlet port 47, passage 48 and choke 49. When the lower left-hand valve 18 becomes fully opened, it vents reference chamber 17 at a faster rate than the venting of brake pipe chamber 16, and thus pressure difference between chambers 16 and 17 becomes reduced to a point of causing the abutment 15 to be restored substantially to its normal position, shutting off both lower valves 18 and completing a first cycle of operation for quick service reduction.

If the brake pipe 10 continues to be reduced in pressure from an extraneous source such as from the locomotive or from an adjoining car, brake pipe chamber 16 continues to reduce in pressure relative to the reference chamber 17, and another cycle of operation like that which has just been described is operable to again cyclically reduce the pressure in the brake pipe locally to provide more local quick service brake pipe reduction. These cycles of operation are effective continuously as long as there is a continuous extraneous reduction in pressure in brake pipe 10.

Typical choke sizes that have been found to provide satisfactory cycling operation as described are 0.02, 0.125, 0.05, and 0.081 inches for chokes 38, 41, 43 and 49 respectively. It should be understood, however, that the sizes of these chokes can be varied in accordance with the requirements of practice. These sizes have been chosen to be used in connection with a well-known quick action chamber volume of 145 cubic inches that is built into a standard pipe bracket to which the control device 13 would be secured.

The frequency of cycling of the quick service valves is determined by the size of the choke 41 and varies inversely with the size of this choke. It has been found that satisfactory operation is obtained with the size of choke 41 varying at least in a range from 0.097 to 0.125 inches.

Also the frequency of cycling of the quick service valves is dependent upon the relative volumes of the quick action chamber 11 and the brake pipe 10. The quick action volume is the same on all lengths of cars, while the brake pipe volume varies in accordance with the lengths of the cars.

It will be readily apparent from the mode of operation as it has been described that where an entire train is equipped with this type of quick service control as a part of the control valve, the longer cars will have more air vented from their brake pipes than the smaller cars, thus reducing the necessity to provide auxiliary quick service valves for long cars as is the current practice. The present quick service valve that can be included as a part of an ABD type control valve, for example, therefore provides the dual function of increasing the rate of brake signal propagation for standard length cars and reducing the necessity of providing quick service valves separate from the ABD valve for longer cars.

For consideration of the mode of operation to provide accelerated release, it will be assumed that the charging of the brake pipe 10 is initiated to cause release of a service application. Under these conditions, the pressure in brake pipe chamber 16 builds up more rapidly than in reference chamber 17, causing abutment 15 to move upwardly and open the upper valve 18 to permit fluid from emergency reservoir 12 to be applied to the brake pipe 10. Under these conditions, emergency reservoir 12 is connected to brake pipe 10 through passage 50, input port 51 of accelerated release valve 18, output port 52, passage 53, choke 54 in the input to check valve 37, outlet port 55 of choke 37 and passage 56. It will be noted that in this mode of operation, the push rod 20 slides within the piston 21, as the piston 21 is maintained in its normal position as shown by fluid pressure in the reference chamber 17. Thus the spring 22 does no actuate piston 21 to a contacting position with the abutment 15 during accelerated release following a service brake application. As the pressure builds up in the train brake pipe 10, the quick action chamber 11 becomes charged through its choke 38, and thus pressure builds up in chamber 17 of the control device 13 to terminate the local accelerated release by restoring the abutment 15 to its normal position.

To consider another condition of accelerated release, it will be assumed that brakes are to be released after an emergency application. During emergency braking conditions, the pressures in brake pipe chamber 16 and reference chamber 17 are substantially depleted, and thus the piston 21 is actuated by its spring 22 to a position limited by the snap ring 24 in contact with the abutment 15 in its normal position. The purpose of this additional spring applied to the abutment 15 is to stabilize the abutment 15 to insure that it will not actuate the accelerated release valve to an open position in response to a small build-up of pressure in the train brake pipe 10 that is not intended as a signal for brake release.

When a brake release signal is applied to the train brake pipe 10 after an emergency application, pressure builds up in brake pipe chamber 16 faster than in reference chamber 17, and when the pressure difference is sufficient to overcome the additional biasing spring 22 as well as the pressure of the stabilizing spring 31 and of the valve spring 19, the piston 21 and push rod 20 above abutment 15 are both actuated upwardly to open the accelerated release valve 18 and permit the application of fluid from the emergency reservoir 12 to the brake pipe for accelerated release as has been described when considering the mode of operation for release of a service brake application. As was considered for a service brake release, the pressures in the brake pipe chamber 16 and the reference chamber 17 substantially equalize, thus restoring the abutment 15 to its normal position as is illustrated in FIG. 1 and restoring the accelerated release valve 18 and piston 21 to their normal positions.

Having thus described a fluid brake control system for a vehicle having an improved quick service and accelerated release control device as a preferred embodiment of the present invention, it is to be understood that various modifications and alterations may be made to the specific embodiment shown without department from the spirit or scope of the invention.

What is claimed is:

1. A fluid brake control system for a train of cars including a car having a brake control pipe, a reference fluid reservoir subject to charge periodically from the brake pipe and an improved quick service control device comprising:
   a. a housing containing a fluid pressure differential operated abutment subject to actuation from a normal position by differences in pressure between respective brake pipe and reference fluid pressure chambers acting on opposite sides of the abutment,
   b. two poppet type valve means on the brake pipe pressure chamber side of the abutment for selectively venting the chambers, each of the valve means being spring biased in the direction of the abutment to a normally closed position and the valve means having respective operating push rods longitudinally disposed between the associated valve means and the abutment, and
   c. the poppet valve means being responsive to movement of the abutment in one direction to vent first the brake pipe fluid pressure chamber and thereafter the reference fluid pressure chamber to alternately reverse the differential in fluid pressure acting on the opposite sides of the abutment to thereby reciprocate the abutment cyclically,
   d. whereby the poppet valve means are opened and closed in turn so as to intermittently reduce the pressure in the brake pipe as long as the brake pipe pressure is being reduced independent of action of the poppet valve means.

2. A fluid brake control system according to claim 1 wherein the operating push rods are laterally spaced and a bridge in the brake pipe chamber is disposed across ends of the push rods respectively between the rods and the abutment, bearing on the abutment at an intermediate point, for permitting sequential operation of the push rods upon actuation of the abutment in accordance with an imbalance of moments of force of opposite sides of the intermediate point.

3. A fluid brake control system according to claim 2 wherein the intermediate point in the bridge is at a mid-point between the push rods and different opening times of the valve means in response to movement of the abutment is accomplished by an imbalance in valve biasing spring pressures.

4. A fluid brake control system according to claim 3 wherein the valve means for permitting flow of fluid from the brake pipe pressure chamber opens prior to the opening of the valve means for permitting flow of fluid from the reference chamber.

5. A fluid brake control system according to claim 1 wherein means is provided for restricting the rate of fluid flow from the brake pipe chamber, more than the rate of fluid flow from the reference chamber.

6. A fluid brake controls system according to claim 5 wherein means is provided for connecting the brake pipe to the brake pipe chamber through a choke of a size selected in accordance with a desired frequency of cyclically reducing pressure in the brake pipe.

7. A fluid brake control system according to claim 6 wherein a bridge is disposed across ends of the push rods respectively between the push rods and the abutment, bearing on the abutment at an intermediate point in the bridge for permitting sequential operation of the push rods longitudinally upon actuation of the abutment in accordance with an imbalance of moments of force on opposite sides of the intermediate point.

8. A fluid brake control system according to claim 7 wherein the intermediate point in the bridge is at a mid-point between the push rods and different relative opening times of the valve means is obtained upon movement of the abutment by an imbalance in valve biasing spring pressures.

9. A fluid brake control system according to claim 1 wherein the control device comprises an accelerated release poppet type valve means on the reference chamber side of the abutment spring biased in the direction of the abutment to a normally closed position and having a push rod longitudinally disposed between the associated valve and the abutment, the accelerated release poppet valve means being opened by movement of the abutment in the other direction from its normal position and including means when open for permitting fluid to flow from a fluid reservoir to the brake pipe for providing accelerated release of brakes of other cars of the train.

10. A fluid brake control system according to claim 9 wherein additional spring biasing means is provided for selectively additionally spring biasing the abutment against movement in said other direction from its normal position dependent upon pressure of fluid in the reference chambers, whereby the additional spring biasing means must be overcome to move the abutment sufficiently to open the accelerated release valve provided pressure in the chambers has been materially depleted as is the condition subsequent to an emergency brake application.

11. A fluid brake control system according to claim 10 wherein the additional biasing means comprises a piston that is spring biased in the direction of the abutment but restricted from contacting the abutment when the abutment is moved in said one direction from its normal position.

12. A fluid brake control system according to claim 11 wherein the piston is restricted from contacting the abutment at times of release of a service brake application by fluid pressure in the reference chamber.

13. A fluid brake control system according to claim 11 wherein the piston is disposed in a bore of the housing and is restricted in its movement toward the abutment by a snap ring in the bore.

14. A fluid brake control system according to claim 13 wherein the push rod associated with the accelerated release valve means passes coaxially through the piston and is slidably operable therein for permitting actuation of the accelerated release valve means to its open position in response to movement of the abutment in said other direction irrespective of movement of the piston.

15. A fluid brake control system for a train of cars including a car having a brake control pipe, a fluid reservoir subject to charge periodically from the brake pipe and an improved quick service and accelerated release control device comprising;
  a. a housing containing a fluid pressure differential operated abutment subject to actuation from a normal position by differences in fluid pressure between respective brake pipe and reference fluid pressure chambers acting on opposite sides of the abutment,
  b. poppet valve means on each side of the abutment spring biased in the direction of the abutment to a closed position and having an operating push rod longitudinally disposed between the associated valve means and the abutment,
  c. first poppet valve means on one side of the abutment being opened by movement of the abutment in one direction from its normal position and including means for permitting fluid to flow from the brake pipe to provide local quick service reduction in brake pipe pressure, and
  d. the poppet valve means on the other side of the abutment being opened by movement of the abutment in the opposite direction from its normal position and including means to permit fluid to be released from the reservoir to the brake pipe for providing accelerated release of brakes of other cars in the train.

16. A fluid brake control system according to claim 15 wherein the improved quick service and accelerated release control device comprises a second poppet valve means on said one side of the abutment spring biased in the direction of the abutment to a closed position and having an operating push rod longitudinally disposed between said second valve means and the abutment and operable to an open position by movement of the abutment in said one direction, the second poppet valve means being effective when opened to permit fluid to be vented from the reference chamber.

17. A fluid brake control system according to claim 16 wherein the first poppet valve means on said one side of the abutment is operable when opened to release fluid at a restricted rate from the brake pipe through the brake pipe chamber.

18. A fluid brake control system according to claim 17 wherein sequencing means is provided for opening said first poppet valve means on said one side of the abutment prior to the opening of said second poppet valve means.

19. A fluid brake control system according to claim 18 wherein the sequencing means comprises a bridge disposed across ends of the push rods associated with said first valve means and said second valve means and having an intermediate point adapted to be actuated by the abutment for permitting the order of operation of the valve means to their open positions to be determined by the relative spring biasing pressures of these valve means.

20. A fluid brake control system according to claim 19 wherein the spring bias of said second valve means is greater than the spring bias of said first valve means for releasing fluid from the brake pipe prior to releasing fluid from the reference chamber upon actuation of the abutment in said one direction relative to its normal position.

21. A fluid brake control system according to claim 15 wherein the poppet valve means on said other side of the abutment comprises additional spring biasing means independent of the valve means for additionally spring biasing the abutment toward its normal position when there has been an emergency brake application and the fluid pressure in the chambers is materially reduced.

22. A fluid brake control system according to claim 21 wherein the additional biasing means comprises a piston that is spring biased toward the abutment and is normally displaced from the abutment by fluid pressure in the reference chamber.

23. A fluid brake control system for a train of cars including a car having a brake control pipe, a fluid reservoir subject to charge periodically from the brake pipe and an improved accelerated release control device comprising;
  a. a housing containing a fluid pressure differential operated abutment subject to actuation from a normal position by differences in pressure between respective brake pipe and reference fluid pressure chambers acting on opposite sides of the abutment,
  b. poppet type valve means on the reference chamber side of the abutment spring biased in the direction of the abutment to a normally closed position, the valve means having an operating push rod longitudinally disposed between the poppet type valve means and the abutment for opening the valve means in accordance with movement of the abutment in one direction from its normal position,
  c. fluid supply means responsive to the opening of the valve means for permitting fluid to flow from the reservoir to the brake pipe, and
  d. additional spring biasing means including a piston having an axial bore for free passage of the push rod for applying additional spring bias against movement of the abutment in said one direction from its normal position only when fluid pressure is materially reduced in the reference chamber.

24. A fluid brake control system according to claim 23 wherein the piston is disposed in a bore in the housing, is spring biased in the direction of the abutment and biased in the opposite direction by fluid pressure in the reference chamber.

25. A fluid brake control system according to claim 24 wherein means is provided for mechanically limiting movement of the piston in the direction of the abutment to prevent the additional spring biasing means from causing movement of the abutment in an opposite direction from its normal position.

26. A fluid brake control system according to claim 25 wherein the mechanical means is a snap ring stop inserted in the bore in the housing between the piston and the abutment.

* * * * *